United States Patent [19]
Sinko

[11] Patent Number: 6,113,989
[45] Date of Patent: Sep. 5, 2000

[54] AQUEOUS PAINT ADDITIVE FOR STAINING INHIBITION AND PROCEDURES

[75] Inventor: John Sinko, Glendale, Wis.

[73] Assignee: Wayne Pigment Corp., Milwaukee, Wis.

[21] Appl. No.: 09/046,354

[22] Filed: Mar. 23, 1998

Related U.S. Application Data

[63] Continuation-in-part of application No. 08/774,810, Dec. 31, 1996, abandoned.

[51] Int. Cl.[7] ................................. B05D 7/06; B05D 1/38
[52] U.S. Cl. ........................ 427/408; 427/382; 427/419.1; 427/419.8
[58] Field of Search ..................... 427/408, 393, 427/419.8, 419.1, 397, 382, 325

[56] References Cited

U.S. PATENT DOCUMENTS

| | | |
|---|---|---|
| 3,183,118 | 5/1965 | Conner . |
| 3,291,635 | 12/1966 | Conner . |
| 3,719,514 | 3/1973 | Taylor . |
| 3,741,782 | 6/1973 | Stewart et al. . |
| 3,852,087 | 12/1974 | Nordyke et al. ................ 106/288 B |
| 3,900,619 | 8/1975 | Lalk et al. ............................. 427/408 |
| 4,021,398 | 5/1977 | Gilman et al. ................. 260/29.6 MM |
| 4,061,720 | 12/1977 | Phillips . |
| 4,097,430 | 6/1978 | Phillips ................................. 260/17 R |
| 4,200,672 | 4/1980 | Sherif et al. . |
| 4,218,516 | 8/1980 | Meyer et al. ........................... 428/537 |
| 4,274,972 | 6/1981 | Sherif et al. . |
| 4,447,570 | 5/1984 | Cook et al. . |
| 4,737,491 | 4/1988 | Leppävuori et al. . |
| 4,844,970 | 7/1989 | Goldstein et al. . |
| 4,933,012 | 6/1990 | Goetze et al. . |
| 4,972,018 | 11/1990 | Leadbetter . |
| 5,041,487 | 8/1991 | Kissel ..................................... 524/377 |
| 5,230,774 | 7/1993 | Greer et al. . |
| 5,460,644 | 10/1995 | Thomassen .......................... 106/18.32 |
| 5,460,645 | 10/1995 | Pandian et al. . |
| 5,472,485 | 12/1995 | Pandian et al. . |
| 5,681,880 | 10/1997 | Desor et al. ........................... 524/320 |
| 5,733,666 | 3/1998 | Sinko .................................. 428/537.1 |
| 5,759,705 | 6/1998 | Sinko .................................. 428/537.1 |

*Primary Examiner*—Diana Dudash
*Attorney, Agent, or Firm*—Ryan Kromholz & Manion

[57] ABSTRACT

A tannin stain inhibiting latex paint composition for application to wood based on an alkaline latex suspension of a polymer in water is provided with a tannin-stain inhibiting additive. The additive includes effective amount for stain inhibition of a non-acidic compound selected from ammonium zirconium carbonate, sodium zirconium carbonate or potassium zirconium carbonate.

4 Claims, No Drawings

AQUEOUS PAINT ADDITIVE FOR STAINING INHIBITION AND PROCEDURES

RELATED APPLICATION

This is a continuation-in-part of U.S. patent application Ser. No. 08/774,810 filed Dec. 31, 1996, now abandoned.

BACKGROUND OF THE INVENTION

Tannin staining of coatings on wood is an undesirable spontaneous process resulting from migration of tannins from the wood, and which is especially acute in the case of aqueous white coatings or aqueous clear coats. Particularly, such staining is a problem in coatings applied on hardwoods such as oak, noted for its high water-soluble tannin content. On oak and other woods such as redwood or red cedar, such staining is observed as dark brown discoloration of coatings or clear coats, which develops cumulatively, causes aesthetic degradation and often limits the service life of wood coatings. Tannin staining of solvent-based opaque coatings or clear coats is notably less prevalent, even on wood substrates of high staining potential.

Under federal and state legislative pressure, intended to minimize volatile chemical emissions, significant efforts of the paint and coating industries are currently invested into development of high performance water-based wood coatings. To enhance the tannin stain-inhibitive properties of such coatings is one of the challenges of the related development work. It is informative to refer briefly to some elements of wood chemistry, the mechanism of the tannin staining process and to the available preventive technologies.

Wood consists mainly of cellulosic and ligninous materials. Diverse wood species also contain variable amounts of extractables, some of which are water-soluble and colored and consequently accountable for staining. It is well known, however, that not all water-soluble colored extractables are tannins, and not all tannins are water soluble. The content of such extractables varies widely among different wood species. The quantitative distribution of the same is known to be variable even among distinct anatomical regions of tree specimens.

The chemical composition, structure and chemistry of colored extractable species is typically complex and not always well known. In addition to tannins, of which redwood, for example, contains approximately 4–12%, other water soluble, colored organic products of complex structure, such as quinones, flavonoids and tropolones are also present in various wood species. It will be interesting to observe that thujic acid, an intensely colored member of the latter family is known to be present in western red cedar, a popular but highly staining wood. Wood is a highly porous material, characterized by a remarkably high average value of capillary specific surface area of about 2000 $cm^2/g$. The cellular walls, and, to limited extent, the cellular cavities or lumens are microscopic storage sites for some soluble extractables, which are concentrated predominantly in heartwood, the physiologically inactive anatomical region of living trees.

Wood is both porous and hygroscopic. It absorbs water vapor up to approximately 30% of the original moisture content by weight, (the fiber saturation point achievable at 100% relative humidity of air) or desorbs moisture in a dynamic equilibrium with the moisture content of the surrounding air. The above absorption process (up to 30% weight increase) is associated with dimensional instability known as swelling and shrinking of wood, considered to be one of the major causes of the physical degradation of the wood coatings.

It will be observed, however, that when exposed to condensing humidity conditions, water content of wood could reach 200% by weight, without additional swelling, because swelling reaches its peak at the fiber saturation point.

Notably, polar organic solvents such as aliphatic alcohols, amines, glycols and derivatives of the same, common components of aqueous or solvent-based paint formulations, are also absorbed by wood, as the result of their ability to form hydrogen bonds with cellulosic —OH groups.

An indirect consequence of porosity and hygroscopicity of wood is tannin staining, the spontaneous and complex process which results in a loss of decorative value, or, if extensive, limitation of the useful service life of wood coatings.

During staining several processes occur concurrently, in a complex and dynamic equilibrium. Practically, it starts at the moment of application, as the paint film's water content penetrates at a relatively high rate and rehydrates the substrate's surface layer. Consequently, the cellular walls, typically collapsed in dry wood materials, are restored to their expanded, porous structure, characteristic of green wood. As a result, water-soluble staining species normally stored in cellular walls or lumen cavities of wood materials, are solubilized, mobilized by absorbed water and thus made available for migration. Consequently, mobilized staining species, driven by concentration gradients will diffuse spontaneously through substrate-coating interfaces into the coatings and toward coating-air interfaces, where cumulative staining occurs.

It is informative to observe, that the high liquid volume ratio of fresh coating applications provides a system open for diffusion, and it is primarily accountable for the high staining rates observable during the film drying period. As a result, aqueous coatings freshly applied on highly staining wood substrates are considerably discolored at the end of the film drying period, typically in about 1 to 2 hours. Concurrently with the above described diffusional processes and depending on the surrounding conditions, water also evaporates, at a variable rate, through the coating-air interface. Because of both processes, fresh coating applications are substantially depleted of water in short time, by the end of the above mentioned film drying period.

Although latex particles coalesce simultaneously and reach an advanced degree of curing by the end of the water evaporation or film drying stage, the completion of the film formation or curing process generally requires a considerably longer time.

It will be noted, however, that cured coatings (inclusive of solvent-based systems) are perfectly water-permeable, and consequently, coated wood substrates interact spontaneously with water, in typical fashion, as previously described. As a result, tannin staining proceeds spontaneously and cumulatively all during the service life of wood coatings, according to the above described mechanism.

The aesthetically acceptable limit of the extent of stain discoloration of white coatings is a matter of subjective judgment. In practice, however, it is reasonable to consider that limit's numeric values (expressed in CIELab) at dE=20–25, measured comparatively against a coating formulation's intrinsic color values on non-staining substrates.

It is important to observe, that if no other destructive processes interfere, high staining rates, which result in substantial discoloration in a short period of time, may limit the useful service life of wood coatings. Notably, however, staining rates of white opaque coatings and clear coats on wood substrates vary widely, a function of service conditions and pertinent formulation parameters. Under normal service conditions, it is the surrounding atmosphere's relative humidity content (R.H.), which determines the staining system's (wood substrate and cured coating) water content and consequently, limits the rate of the related discoloration process. There are experimental data to indicate, that discoloration of latex coatings on redwood proceeds at significant rates at R.H. values close to 100%, which correspond to the fiber saturation point of the substrate. On the other hand, at R.H. <30% the same values are negligible.

Alternatively, under condensing humidity conditions, wood substrates are (at least intermittently) saturated with water and consequently, staining rates will be diffusionally limited, controlled essentially by the related coating's physical structure and more specifically, by the permeability or porosity of the same. Dependent on intrinsic porosity and composition, wood coatings display semi-permeable behavior with respect to staining processes. Without obstructing substantially the rate of water absorption by the substrates, they limit however, the in situ diffusion rate of dissolved colored substances and, consequently, determine the pertinent rate of self-discoloration.

As is well known, organic coatings' porosity is variable to a considerable extent, a function of certain formulation parameters. For example, the inverse proportionality between coatings' PVC values and resultant porosity is common knowledge in the art of paint manufacturing.

At any given PVC value, however, the porosity of an organic coating depends significantly on the resin component's film-forming characteristics, as well. In that respect, it is generally well known, that solvent-based resins typically form coatings of low porosity, which also display good stain inhibition capacity. Conversely, aqueous acrylic latex-based paint formulations are known to form comparatively porous coatings, which, as indicated above, are characterized by relatively poor stain inhibitive characteristics.

Notably, however, as is common knowledge in the art, the film-forming characteristics of aqueous latices vary significantly as a function of quality parameters, such as polymer structure, average latex particle size, Tg temperature, film-forming temperature and coalescent solvent, among others. In general, in the development of latex-based paints, all of the above-mentioned formulation parameters as well as price are optimized for most cost-effective stain-inhibitive capability of the resultant coating. Additionally, to as above-mentioned, however, there are specific procedures available to enhance effectively the staining inhibitive capability of latex-based wood coatings. The employment of stain inhibitor pigments or "tannin blockers" constitute such procedures used in the art. See, for example, my U.S. Pat. No. 5,529,811. Pigment grade stain inhibitors are believed to function by adsorbing or chemosorbing tannin species in situ in the coatings, preferably as light-colored compounds. A severe limitation of such inhibitors, however, is their incompatibility with aqueous clear coats and stains intended for application to wood.

A distinct approach to enhancing the stain inhibitive capacity of aqueous wood coatings is disclosed in U.S. Pat. No. 5,320,872 by T. E. McNeel et al., who recommends the addition of diverse complexing agents to the pertinent paint formulations. It is interesting to observe, that complexing agents do not directly interact with staining species such as tannins, but rather prevent the formation of intensely colored tannates, and specifically Fe-tannates, by complexing the available transition metal ions in situ of coatings.

Considering the above presented examples, it is apparent, that heretofore known procedures achieve inhibition of tannin staining as a result of specific chemical interactions, which take place in situ with wood coatings, between staining species (or alternatively, heavy metal cations such as Fe(III), as noted above) and functional constituents (or additives) to the coatings, such as stain inhibitor pigments.

It is also apparent that the possibility of enhancing the stain inhibitive capacity specifically of latex based coatings, by reducing the porosity or permeability of the same and thus, by minimizing the in situ diffusion rates of staining species, thus minimizing the rate of observable staining has not been recognized.

SUMMARY OF THE INVENTION

An object of this invention is to more specifically achieve inhibition of staining of coatings by the employment of paint additives capable of chemically interacting with and improving the film forming characteristics of the latex components of aqueous clear or opaque paint formulations. Thus an aspect of the invention relates to promotion of the formation of less porous water borne coatings. A related aspect relates to formation of primer coatings which are sufficiently porous to permit water migration while preventing migration therethrough of stain-causing molecules.

It is important to note that perhaps 80% of all aqueous paint formulations intended for wood protection are acrylic latex-based, all of which are alkaline systems having a pH=8–9. Additionally, poly-urethane latices and various copolymer latices such as various acrylic-urethane and acrylic-vinyl copolymer based ones, as well as latex blends of similar compositions (such as acrylic latex and poly-vinyl acetate latex blends), which enjoy some level of commercial acceptance for wood applications and are also alkaline systems, may be modified pursuant to the invention.

The invention is also applicable to non-alkaline polymer solutions or suspensions such as poly-vinyl acetate (PVA) latices, known to be characterized by moderately acidic intrinsic pH values, typically of about pH=6. Thus the invention has general applicability to both latices and aqueous polymer solutions having a pH generally in the range of 5–10.

It is important to also note, however, that paint formulations based on PVA latices, hithertofore have displayed poor tannin stain inhibition and consequently, despite the PVA latices' competitive price, such paint formulations have found limited applications in wood protection. It can be concluded, that pH-compatibility with the specific paint medium used is a requirement for practice of the invention.

It was discovered pursuant to the present invention, that as additives, water soluble zirconyl salts pH-compatible with aqueous latex-based paint systems, significantly enhance the tannin stain inhibitive capacity of resultant coatings on wood substrates. Of course, the ability of various soluble zirconyl salts to react with and to convert water soluble or dispersed polymers into insoluble film, is well known and extensively applied by the art (see U.S. Pat. No. 3,741,782, Stewart et al).

Also not heretofore recognized was the direct correlation which exists between porosity and tannin stain inhibitive capacity of wood coatings, as subsequently demonstrated according to the present invention. Furthermore, as clearly exemplified in the Gilman et al. U.S. Pat. No. 4,021,398 (1977) (column 9, lines 55–60) wherein acidic zirconyl salts such as nitrates, chlorides or oxychlorides and sulfates are correctly declared inapplicable in latex emulsions intended for wood applications, the prior art failed to recognize the suitability of alkaline zirconyl salts for this purpose.

It is important to further note that a fundamental aspect of the present invention relates to the recognition of the applicability of water soluble zirconyl salts, which are pH-compatible with typically alkaline latex-based paint formulations, as effective stain inhibitor additives in aqueous paints intended for wood protection. Few water soluble, stable zirconyl products of alkaline character, have been found effective in the practice of the invention where pH compatibility is critical, namely, ammonium zirconium carbonate, sodium zirconium carbonate, and potassium zirconium carbonate. All form aqueous solutions, which at 20–22% $ZrO_2$ contents are characterized by relatively high pH values of pH 9, and pH 10.5, respectively and are extensively used in many industrial applications.

There is no intention, however, to exclude any other zirconyl compounds, which basically satisfy the above specified requirements, for example, ammonium zirconium-, sodium zirconium- or potassium zirconium lactate, glycolate, citrate, tartrate, mandelate, acetate, etc. Also, it is well known that alkaline ammonium, sodium or potassium zirconyl carbonate solutions can be modified and could contain, as well, significant amounts of various different additional (inorganic and organic) anionic species, other than carbonates. Such anionic species typically include —$SO_4$, —$NO_3$, —Cl, borate or, alternatively, of diverse mono-, poly- or oxy-carboxylic acids such as acetic, formic, propionic, tartaric, citric, lactic or glycolic; it is believed, however, that such additional anionic species do not specifically contribute to the tannin stain inhibitive activity of basic zirconyl salts.

Procedures for preparation of sodium and potassium zirconyl carbonates in aqueous suspensions or solutions are well documented in the literature. See, for example, U.S. Pat. Nos. 3,741,782 and 4,097,430. Essentially, soluble acidic zirconyl salts such as zirconyl oxychloride or, typically, wet basic zirconyl carbonate is dissolved in $Na_2CO_3$ or $K_2CO_3$ aqueous solution with agitation at 55–65° C., keeping the $ZrO_2$/carbonate molar ratio at 1/1 to ½.

Briefly, the invention provides a tannin stain inhibiting paint composition for application to wood based on an aqueous polymer latex and containing a tannin-stain inhibiting additive. The additive includes an effective amount for stain inhibition of a water soluble non-acidic compound selected from ammonium zirconium carbonate, sodium zirconium carbonate or potassium zirconium carbonate or mixtures of the same.

In the context of the present invention, with no intention to exclude other alkaline and soluble zirconyl salts, however, relatively concentrated ($ZrO_2$ contents of 20–22%) aqueous solutions of ammonium zirconium carbonate are preferred. The volatility of the carbonate and ammonia moieties are important in coating applications.

Particularly, the ammonium constituent is volatile, and after its escape through volatilization, it is theorized that the film forming characteristics of the latex polymer suspension are improved by the remaining zirconyl compound. However, sodium zirconium carbonate or potassium zirconium carbonate can be substituted.

Techniques for preparation of ammonium zirconium carbonate solutions are well documented in the literature. For example, it is possible to neutralize acidic zirconyl salts, such as zirconyl acetate, nitrate, chloride or sulfate with appropriate amounts of aqueous ammonia and/or $NH_4HCO_3$, as illustrated in U.S. Pat. No. 3,741,782, provided that the particular anionic species are compatible with the intended applications.

Various techniques of preparation of ammonium zirconium carbonate solutions are also documented in Phillips U.S. Pat. No. 4,061,720. Such solutions are obtained by dissolving wet zirconyl carbonate paste in an aqueous solution of ammonium carbonate or alternatively, in an equimolar mixture of ammonium bicarbonate and aqueous ammonia, performed usually under extensive stirring at higher than ambient temperatures.

The recommended $ZrO_2$/ammonium carbonate molar ratio is variable between 1/1.5–3.0. For economical reasons, however, values of 1/1.5–2.0 are preferred.

It was observed pursuant to the present invention, that if the solubilization process is performed in open system as commonly practiced in the art, considerable amounts of ammonia and $CO_2$ are lost and released into the environment. For example, the reaction mixture according to the subsequently presented Comparative Example, is expected to yield a theoretical amount of about 200 g. ammonium zirconium carbonate solution containing approximately 11 per cent $NH_3$ by weight. In practice, however, the process performed in open system and under the indicated conditions, resulted in clear solution with an $NH_3$ content of only 6%, which corresponds to a 45% loss of the total $NH_3$ initially introduced in the system. Considering that $NH_3$ losses are unacceptable for many reasons, it is preferred according to the present invention to perform the solubilization process in a closed system, under correspondent pressure, higher temperature (up to 65° C.) with extensive agitation.

Practical realizations of the solubilization process in closed systems are presented in Examples 1–4. As expected, in closed systems no $NH_3$ or $CO_2$ loss occurs during the solubilization process, which results in significant advantages. Among these are considerable savings in raw materials ($NH_3$ and $NH_4HCO_3$), no $NH_3$ release into the environment and predictability of the chemical composition of the resultant zirconium salt solution.

It was also discovered pursuant to the present invention, that it is beneficial to modify the composition of aqueous ammonium zirconyl carbonate solution intended for applications as paint additives by introduction, in variable amounts, of diverse cationic species compatible with the alkaline medium. Although solubility is a limiting factor in this respect, the list of applicable cationic species, nevertheless, includes Co(II), Ni(II), Cu(II), Ag(I) and Zn(II), among others. The introduction of Zn(II) and Cu(II) species were found to be distinctively beneficial at applicable ranges of molar ratios, as follows: Zr/Zn=from 10/1 to 1/1, but preferable 3/1 and Zr/Cu=9/1.

Regarding the beneficial effect of Zn(II) species (introduced at Zr/Zn=3/1 molar ratio), it was observed pursuant to the present invention, that although it displayed increased tendency for gelling, and stabilization was required as illustrated in Examples 3 and 4, the Zn(II)-modified versions of aqueous ammonium zirconyl carbonate solutions in stabilized form provide improved shelf-stability of acrylic latex-based paint formulations, in comparison with unmodified versions of the same. (see Example 6).

Notably, numerous additives are known to prevent gelling of alkaline zirconyl salt solutions. Regarding stabilization of Cu(II)-modified ammonium zirconium carbonate solution, see U.S. Pat. No. 4,274,972 (Sherif et al).

As for the benefit realized by introducing Cu(II) species into the ammonium zirconyl carbonate solution according to the present invention, it will be noted that the former are known for their effective fungicide and mildewcide activity. It is important to observe in this sense, that the service conditions (high humidity and warm climate) which promote tannin staining of wood coatings also support the growth of various fungi. In such conditions, in addition to the aesthetic degradation caused by dark fungal colonies, fungal attack promotes the accelerated breakdown of coatings and ultimately of wood substrates, as well. Consequently, fungal growth control capacity is an essential function of wood coatings, in order to extend the service life and to improve the overall protective performance of such systems.

Based on the above presented considerations, Cu(II)-modified ammonium zirconium carbonate solutions are expected to display dual functionality in aqueous latex-based paints intended for wood protection, and specifically tannin stain inhibition and fungal growth control.

Procedures applicable for preparation of stabilized and diluted solution of Cu(II)-modified ammonium zirconium carbonate, in open systems, however, are disclosed in U.S. Pat. Nos. 3,291,635 and 4,274,972 by Conner and Sherif et al, respectively.

Examples 2–4 of the present invention describe the preparation procedures in closed system of Zn(II)- and Cu(II)-modified concentrated ammonium zirconium carbonate solutions, applicable as tannin stain inhibitor additives in latex-based paints.

The present invention's reduction to practice, further demonstrated in Examples 5–8, includes additional operations such as: aqueous paint preparation (typically recommended for wood protection) with and without addition of zirconyl salt solution, stability test of prepared paint, test panel preparation by paint application on selected wood substrates, humidity exposure of test panels, instrumental measurement of panels' stain discoloration, among others.

All Examples of realization 5–10, are intended to demonstrate the applicability and usefulness of basic zirconyl salts (specifically of ammonium zirconium carbonate and its modified versions) as tannin stain inhibitor additive to aqueous paint systems.

For that purpose, typical primer and typical topcoat opaque formulations were prepared as test paint systems, based on two commercially available acrylic latices, both recommended for wood coatings (see Example 5) and based on a commercial PVA latex (see Examples 9 and 10). Notably, none of the formulations contained any specialized tannin stain inhibitor pigments.

Pursuant to the experimental protocol used, two versions of the primer formulation were prepared: the test primers, containing aqueous solutions of ammonium zirconium carbonate (Zn(II) modified and stabilized, according to Example 3) and control primers, without such "additive".

The selection of test paint systems was appropriate, considering that perhaps as much as 80% of all aqueous paint products intended for wood protection are acrylic latex-based.

Commercially acceptable additives to aqueous latex-based paints are expected to satisfy stringent performance requirements, such as:
not to interfere with the rheological stability of paint systems,
to maintain performance activity (in this case the tannin stain inhibitor activity) all during extended shelf-life of paint systems,
to contribute significantly, at low specific consumption, to the tannin stain inhibitive capacity of wood coatings,
to be environmentally compatible, among others.

Zirconyl salts are known to exist in aqueous solutions as polynuclear hydroxy species, cationic, anionic or electrostatically neutral, depending on the ionic environment and pH of the medium.

Exploited in numerous industrial applications, such as starch insolubilization (employed in some paper coating technologies), zirconyl species in aqueous medium are known to be able to interact with water soluble or emulsified organic resins, more specifically with —OH, —COOH functional groups.

It is also known that zirconyl salts form solutions of limited stability, and that significant changes of pH or temperature increase hydrolysis of the polymeric species and thus separation of insoluble hydrated zirconium oxides takes place.

Taking into account all of these considerations, a thorough evaluation of ammonium zirconium carbonate solutions' applicability as tannin stain inhibitor additives to aqueous latex-based paints, was carried out pursuant to the present invention.

Since practically all aqueous paints for wood are alkaline systems, pH-compatibility, necessity for any additives intended for such applications was provided by using ammonium zirconium carbonate solutions.

To demonstrate more specifically the criticality of the pH-compatibility requirement and also to explore the feasibility of such applications, an aqueous solution of zirconyl acetate was also tested as a paint additive. Zirconyl acetate is a mildly acidic (pH=3–4) material, which contains electrostatically neutral zirconyl species.

As disclosed in Comparative Example 2, due to pH-incompatibility with aqueous latices of alkaline character and in contrast with the behavior of ammonium zirconium carbonate, mildly acidic zirconyl acetate destabilizes acrylic latex-based paint formulations; in such cases, pH changes promote formation of active zirconyl hydrogel, able to interact with functional groups of resin components and to cause severe changes in rheological properties of paint systems.

Based on the above presented facts it can be concluded, that zirconyl acetate and several more acidic water soluble zirconyl salts such as oxychloride, sulfate, nitrate etc., cannot be employed as tannin stain inhibitor additives to aqueous latex-based paint systems.

Although the pH-compatibility requirement was satisfied with ammonium zirconium carbonate solutions, it was still uncertain however, whether redwood panels and allowed to dry overnight. It was earlier discussed that, during film formation of aqueous paint applications, rehydration of the wood substrates' surface layer takes place, which results in solubilization and diffusion of tannin species into the wet paint applications. As a result, fresh primer applications, specifically on highly staining wood substrates, are considerably discolored at the end of film forming period. Notably, this process as discussed in my pending patent application Ser. No. 518,161 filed Aug. 25, 1995, cannot be controlled by paint formulation parameters, such as pigmentation or employment of stain inhibitor additives. It can be minimized however, by "sealer" application directly on the wood surface.

As additives to aqueous paints, the chemical reactivity of zirconyl salts (preserved during shelf life in pH-compatible paint systems) will be consumed by chemical interactions, primarily with the resin components, during the film formation period of a paint application. Consequently no effective amounts of reactive zirconyl species will be available to diffuse into, to interact with wood substrates during the same time period and for that reason no "sealer" effect is possible.

Although not expected to occur, an important objective of the present invention was to assess the extent of zirconyl salts' "sealer" effect on wood substrates, when the former are present as soluble additives in fresh aqueous paint applications.

The above objective was realized with respect to Zn(II)-modified aqueous ammonium zirconium carbonate solution (according to Example 3) by measuring dE and dEc, the extent of discoloration (due to staining) of the overnight dried test and control primer applications on redwood, respectively. A brief presentation of the applied experimental technique follows.

In accordance with expectations, low calculated Is values, the subsequently defined "sealer" efficiency index of the zirconyl salt additive indicates, that tannin species' diffusion through the substrate-coating interface is not obstructed to any significant extent during the film forming period of test primer application. No significant "sealer" effect of the zirconyl salt additive was observed (see applicable section of Example 7 and 10).

A more important objective of the present invention was, however, to demonstrate the existence of tannin stain inhibitive effects of soluble zirconyl salts as additives to aqueous latex-based paints with which the former are pH-compatible. Such effect is not known in the prior art.

It is known by the art, that zirconyl species activated in situ by drying processes of fresh coating applications, react with the resin components, and consequently improve the film forming characteristics of aqueous latices. Since however, improved film properties characterize already formed coatings but evidently do not also prevent staining during film formation (see above, regarding low value of Is) of the same, the correlation between such reactivity of soluble zirconyl salts (as paint additives) and the stain inhibitive capacity of resultant wood coatings was not obvious.

It was for the first time recognized pursuant to the present invention, that ammonium zirconium carbonate (and modified versions of its aqueous solution) as additives to aqueous latex-based paints, enhance the tannin stain inhibitive capacity of resultant wood coatings. The effect was conveniently demonstrated and measured according to the present invention, by overcoating the above described test panels' control and test primer applications with 3 mil applications of topcoat formulation and by exposing the previously cured coating systems to condensing humidity conditions for 6 days.

As earlier discussed, during exposure to condensing humidity, wood substrates rehydrate and tannin staining of related coating applications occurs at high rates, offering possibilities for quantitative evaluations. By measuring, in identical conditions, the test and control panels' topcoats' extent of discoloration, the test and control primers' relative tannin stain inhibitive capacity and consequently, the stain inhibitor additives' contributions to the same, can be determined. Pursuant to the present invention, values of the test and control panels' extent of discoloration, dE and dEc respectively, were measured after humidity exposure, by means of a computer assisted reflectance spectrophotometer (in CIELab color measurement system) against absolute white color standards. It will be noted, dE values are numeric measures of related extent of tannin staining, being also inversely proportional to the stain inhibitive capacity of pertinent coating systems.

Based on the above considerations, Is the "sealer" Efficiency Index (see also above) and Ia, the "additive" Efficiency Index of the same stain inhibitor additive (in this case prepared according to Example 3) can be calculated, according to % Is or Ia=100 (dEc−dE)/dE. High values of Ia, such as Ia>100% indicate significant contribution by the additive to the tannin stain inhibitive performance of the host coating. As presented in the applicable section of Examples 7, 8 and 10, aqueous ammonium zirconium carbonate solutions modified by Zn(II) species (according to Example 3 of the present invention) as additives to aqueous latex-based paints, display high tannin stain inhibition activity and satisfy all quality requirements of additives.

In order to evaluate the applicability of ammonium zirconium carbonate as a tannin stain inhibitor additive in aqueous clear coats, such product obtained according to Example 3 of the present invention was tested in a commercial acrylic latex-based clear formulation on oak veneer, in similar fashion as above disclosed. Results and conclusions are presented in Example 8. Examples 9 and 10 demonstrate the applicability of the same in PVA latex based paints.

Subsequently presented exemplifications of the present invention's reduction to practice, with no intention to limit its applicability in any sense, include brief descriptions of aqueous ammonium zirconium carbonate solutions' (and of modified versions preferred in the context of the present invention) preparation in a closed system and more specifically, include practical details with respect to use of such aqueous solutions as additives to paints intended for wood protection.

COMPARATIVE EXAMPLES

Examples subsequently presented are intended to provide evidence regarding existing limitations of the art in comparison to the object of the present invention.

Comparative Example 1

Comparative Example 1 is presented to demonstrate, that if performed in an open system as suggested by the art, the process of ammonium zirconium carbonate preparation results in significant loss of $NH_3$, $CO_2$ and notably, it does not allow accurate control of the final product's composition by adjustment of the amounts of raw materials used. For that purpose, 100.0 g of wet basic zirconyl carbonate (containing 40% $ZrO_2$, about 6% $CO_2$ and about 50% $H_2O$) and 51.5 g. ammonium bicarbonate was predispersed by agitation in 36.8 g aqueous ammonia (30% $NH_3$) and 12 g water in an open system. The solubilization process was finalized in about 4 hours, by continuous agitation and a gradual increase of the temperature of the system to 60° C. Approximately 185 g of clear solution of ammonium zirconium carbonate was recovered, containing (by weight) 13% $CO_2$, 6% $NH_3$ and 20.5% $ZrO_2$. Notably, 11% $NH_3$ and 7% $CO_2$ are the theoretically expected contents in the solution. Consequently, it is important to note that 45% of total $NH_3$ and about 25% of total $CO_2$ initially introduced in the reaction mixture, are lost during the solubilization process performed in an open system.

Comparative Example 2

The intent of Comparative Example 2 was to evaluate the well known pH-compatibility requirement, which must exist between aqueous solutions of zirconyl salts, intended for use as paint additives, and aqueous latex-based paint systems. For that purpose, aqueous solution of zirconyl acetate was chosen, which is a mildly acidic composition, typically characterized by pH =3.5–4.2 and assay of about 20% $ZrO_2$. This solution was prepared according to known procedures which is also described in my copending patent application Ser. No. 08/518,161 filed Aug. 23, 1995.

Aqueous acrylic latex-based paint formulation, described subsequently as "control primer" in Example 5 and characterized by pH=9.0, was selected as representative of a paint system recommended for wood applications. It is important to note, that 80% of all aqueous paint systems intended for wood protection are acrylic latex-based and are alkaline with a pH of 8.5–9.0.

A pH-compatibility test, as above described, was performed by adding (under adequate agitation and ambient temperature conditions) aqueous zirconyl acetate solution to the control primer formulation in a 2.5 g./100 g ratio.

As large agglomerates were observable in a short period of time, it became evident that the latex component of the system was destabilized by the mildly acidic zirconyl salt solution. It was concluded, that the system lost its paint consistency and lost its utility for that purpose.

It is important to note that other commonly available zirconyl salts such as chlorides (oxychloride), nitrate, sulfate in stable aqueous solutions of about 20% $ZrO_2$ content, are comparatively more acidic, characterized typically by pH<1.0, and consequently are even less useful as tannin stain inhibitor additives to aqueous latex-based alkaline paints.

EXAMPLES

All subsequently presented Examples are intended to provide detailed descriptions of practice of the present and also to demonstrate its effectiveness with respect to inhibition of tannin staining of wood coatings.

Example 1

This Example demonstrates the advantages and feasibility of performing the preparation of ammonium zirconium carbonate aqueous solution in a closed system.

The solubilization process was performed in closed apparatus consisting of flask, magnetic stirrer, heated water bath, manometer and safety valve.

For that purpose 100.0 g of basic zirconium carbonate (assay: 40% $ZrO_2$; 6% $CO_2$; 53% total $H_2O$:, 25 g water, 7.0 g aqueous ammonia (30%) and finally, 18.0 g of $NH_4HCO_3$, all available commercially, were introduced in the above described apparatus, at ambient temperature. The initial mixture's chemical composition corresponded to molar ratios as follows: $ZrO_2/CO_2$=1:1.8; $ZrO_2/NH_3$=1:2.2; $CO_2/NH_3$=1:1.2.

Performed with intense stirring and gradual (in about 2 hours) rise of the system's temperature to 60–65° C., the solubilization process was completed in about 3 hours. The maximum value of pressure measured in the system during the solubilization process, was about 15–20 inches of Hg, which dropped, however, to about 8–9 inches of Hg by the end of the procedure.

The slightly opaque solution of ammonium zirconium carbonate, recovered with practically 100% yield, was analyzed and found to be characterized by approximate values of the quality parameters, as follows: assay=20.3% $ZrO_2$; 13% $CO_2$; 5.9% $NH_3$; pH=9–9.5; specific gravity=1.35.

Since $NH_3$ or $CO_2$ losses did not occur during the solubilization process, in contrast with Comparative Example 1, the final product's chemical composition corresponded to that which was expected.

As for its stability, the final product kept at 55° C. for several days, did not display a tendency for gelling.

Example 2

Ammonium zirconium carbonate aqueous solution modified by introduction of Zn(II) species, was produced in a closed system, identically to that described in Example 1, except that the initial reaction mixture was composed of 38.0 g basic zirconyl carbonate, 11.5 g aqueous ammonia, 20.5 g water and 18.0 g of $NH_4HCO_3$. After the solubilization process was completed, 3.3 g ZnO was easily dissolved into the semi-transparent solution, previously cooled to about 40° C. The chemical composition of the initial reaction mixture corresponded to the following molar ratios: $ZrO_2/ZnO$=3:1; $[ZrO_2+ZnO]/CO_2$=1.8; $[ZrO_2+ZnO]/NH_3$=1:2.6. The recovered semi-transparent solution was analyzed and was found to correspond to the expected values of quality parameters, as follows: assay=18.8% $[ZrO_2+ZnO]$; $CO_2$=13%; $NH_3$=7.1%; pH=9.1–9.3; specific gravity=1.33. Kept at 55° C. for 3 days, the final solution gelled irreversibly.

Example 3

Stabilized version of the ammonium zirconium carbonate aqueous solution modified by introduction of Zn(II) species, which hereafter is referred to as "additive", was prepared by solubilizing 1.0 g tartaric acid in 100.0 g of solution obtained according to Example 2. The solubilization process was performed at ambient temperatures with stirring. A semi-transparent unaltered solution, practically identical to its unstabilized form, resulted, having pH=8.9. Stored at 55° C. for several days, however, the stabilized aqueous solution did not display any tendency for gelling. The stabilized and Zn(II)-modified aqueous solution of ammonium zirconium solution was used as a paint "additive" in all subsequent Examples of illustrating application of the present invention.

Example 4

Ammonium zirconium carbonate aqueous solution modified by introduction of Cu(II) species, was prepared in a closed system in identical fashion to that described in Example 2, except that, (instead of ZnO) 2.5 g of freshly precipitated copper-borate ($Cu(BO_2)_2$) was introduced into the initial reaction mixture. The resultant semi-transparent and moderately blue solution, which contained Cu(II) species in Zr/Cu =7.5:1 ratio, was characterized by pH=9.1 and assay (by ignition) of approximately 19% total oxides.

Example 5

White opaque topcoat and primer paint formulations (identified below as "topcoat and primer", of a type typically recommended for wood protection and useful in the practice of the present invention are described below. It will be observed, that neither formulation contained any tannin staining inhibitive constituent. It will be noted also, that two versions of the primer formulation were prepared, a control with no additive and the test primer formulation, containing ammonium zirconium carbonate aqueous (stabilized) solution modified by Zn(II), further referred to as stain inhibitor "additive", prepared according to Example 3 of the present invention.

| Components of | | Parts by Weight | |
|---|---|---|---|
| Formulas (Suppliers) | Trade Names | Topcoat | Test Primer |
| Water | — | 230.0 | 207.0 |
| TiO2 | RCL-535(1) | 182.0 | 150.0 |
| Filler pigment | Gammaspers 80(2) | 182.0 | 116.0 |
| Stain inhibitor pigment | — | 0.0 | 0.0 |
| Coalescent solvent | Ethylene glycol | 28.0 | 19.5 |
|  | Texanol(4) | — | 5.0 |
| Freeze stabilizer/ Coalescent | Propylene glycol | 38.0 | — |
| Stabilizer | Surfynol 104 A(5) | 4.5 | 2.0 |
|  | Drewplus-475(3) | 1.2 | — |
| Thickener | Acrysol QR-708(6) | — | 5.5 |
|  | Natrosol 250 MHR(7) | 3.5 | 0.5 |
|  | Same of 2.5% | 11.0 | — |
| Dispersant | Disperbyk-181(8) | 11.5 | — |
|  | Tamol 681(6) | — | 12.0 |
| Defoamer | Foamaster VL(9) | — | 1.2 |
| Biocide | Skane -8 (6) | 2.3 | 2.0 |
| Neutralizer | Ammonia, 28% | 2.5 | 1.0 |
| Latex resin | Rhoplex AC-264(6) | 424.5 | — |
|  | Maincote MV-23LO(6) | — | 520.0 |
| Stain Inhibitor Additive | According to Ex. 3 | — | 26.0 |
|  |  | 1121.0 | 1067.7 |

Suppliers of components are: (1) SCM Chemicals; (2) Georgia Marble Co.; (3) Drew Chemical Co.; (4) Eastman Chemical Co.; (5) Air Products and Chemicals; (6) Rohm and Haas Co.; (7) Aqualon; (8) BYK Chemie; (9) Henkel Co.; (*) The control primer formulation did not contain any stain inhibitive additive. It is important to note, all the formulations' (control and test primer, topcoat) alkalinity was found typical of pH=8.5–9.0.

Example 6

Both, the control primer and test primer formulation prepared according to Example 5, were comparatively tested for stability, in order to detect any effect of the paint "additive" (according to Example 3) might have on the rheological stability of acrylic latex-based aqueous paint systems. The stability test was performed as commonly recommended in the paint industry, as follows:

The viscosity of both, the control and test primer was measured at ambient temperature. Tightly covered samples of each, kept at 130° F. for 4 weeks, were visually examined and their viscosity measured again at room temperature at the end of the test period. Results of the stability test were as follows:

Visual examination of the samples did not reveal any tendency of phase separation or sedimentation of the test primer formulation. Limited settling of the control primer formulation was observed, however.

No significant increase in viscosity of either sample was detected. The measured viscosity values (expressed in Krebs, or KU units) for the control and test formulation, were as follows:

initial values: 100 and 102, respectively;

final values: 97 and 96, respectively;

Based on these results it can be concluded, that the stabilized form of the aqueous ammonium zirconium carbonate solution (paint additive) prepared according to Example 3, does not present destabilizing effect on acrylic latex-based alkaline paint formulations, and consequently it can be considered as a suitable additive for such paints. It is important to note, the same samples of the control and test primer, which were subjected to 140° F. for 4 weeks, were subsequently used in the application test described in Example 7.

Example 7

The compositions of the present invention were tested on two surface finished redwood panels of about 20 square inches, each. For that purpose, control and test panels were prepared by 6 mil letdown bar application on separate panels of the control primer formulation and the test primer formulations, respectively. It is important to observe that, prior to application, both primer samples were exposed to stability test (130° F. for 4 weeks), in accordance with Example 6.

After drying overnight at ambient temperatures, the pertinent values of the extent of discoloration (dEc and dE, respectively) on both the primed control and test panels, were measured by the applicable earlier described technique. Notably, dEc and dE values measured as specified, allowed quantitative evaluation of the tannin stain inhibitor additive's "sealer" effect. Related experimental data and calculated Is ("sealer" Efficiency Index) values are presented below in Table 7.1. It will be observed, that the above color values were measured against an absolute white color standard.

Subsequently, both primed panels were top coated with a 3 mil thick application of the topcoat formulation which was free of reactive zirconyl components (see Example 5) by the same technique as above specified, allowed to cure for 3 days under the same temperature conditions, after which they were exposed to condensing humidity conditions, at 100° F., continuously, for 6 days. Notably, the topcoat formulation did not contain a stain inhibitor. The extent of discoloration, which occurred during the humidity exposure on both the top coated control and test panels, was again measured again in identical fashion as specified above. Pertinent experimental data and calculated Ia values are presented in Table 7.2.

It is important to observe, that Ia, the "additive" Efficiency Index as earlier introduced, is a quantitative measure of the effectiveness of the additive of Example 3 with respect to tannin stain inhibition. The experimental results are as follows:

TABLE 7.1

| dE | dEc | Is, % |
|---|---|---|
| 7.8 | 6.9 | 13 |

Low value of the "sealer" Efficiency Index (Is=13%) indicates, that the ammonium zirconium carbonate solution used as a paint additive according to the invention, does not prevent stain discoloration of freshly applied primers and consequently, it does not act as "sealer" on the substrate-coating interface.

TABLE 7.2

| dE | dEc | Ia, % |
|---|---|---|
| 7.0 | 17.0 | >140 |

Ia>140% indicates significant stain inhibitive effect and contribution by the "additive" to the stain inhibitive capacity of the aqueous acrylic latex-based coating system when applied on redwood.

Thus, ammonium zirconium carbonate aqueous solution (prepared according to Example 3, when used as paint additive, is found to promote the formation of acrylic latex-based coatings of low porosity. Notably, the high value of Ia also demonstrates, that the additive's chemical activity was not minimized under the stability test conditions (see Example 6) and consequently, it can be considered to be a commercially useful tannin stain inhibitor additive, which is both highly active and pH-compatible with aqueous latex-based and typically alkaline paint systems.

Example 8

In order to demonstrate the efficiency in clear coats of the tannin stain inhibitor additives of the present invention, a control exhibit was prepared by three successive brush applications of a commercially available clear acrylic latex (trade name: Safe & Easy—Interior wood finish from Deft Coatings) on one-half of the surface (approximately 25 square inch area) of an oak veneer panel. One hour of drying time was allowed and sanding of the surface was performed between coats.

A test exhibit was produced, in identical fashion as above described, on the other half of the same substrate, except that prior to the application, ammonium zirconium carbonate solution (prepared according to Example 3) was added while stirring to the clear acrylic latex in a 2.5 g/100 g ratio.

Dried overnight under ambient conditions, the panel was later exposed to condensing humidity conditions for 24 hours. Subsequently, the related dEc and dE, values indicative of the extent of discoloration of the control and test exhibits, respectively, were measured, following the earlier described experimental techniques. It is important to note, that in this case the coated test veneer surface unexposed to condensing humidity was chosen as a color standard against which all the color values were measured.

Ia, the value of the Efficiency Index of the stain inhibitor additive was calculated as above specified, considering the measured values of dEc=9.7 and dE=1.0. The found value of Ia =670% indicates highly effective tannin stain inhibitive performance on oak of the additive according to the present invention, applied in combination with aqueous acrylic clear coats.

Example 9

A white polyvinyl acetate (PVA) based paint formulation was prepared in order to demonstrate the applicability and efficiency of ammonium zirconium carbonate (prepared according to Example 3 of the present invention) as a tannin stain inhibitive additive to such systems. As a latex component, EPS 2537 was used, a PVA latex (manufactured by Engineered Polymer Solutions, Inc.) characterized by an intrinsic pH of approximately pH=6.0. The relatively acidic PVA latex was incompatible with alkaline zirconyl salt solutions such as ammonium zirconium carbonate, therefore the latter was post-added to the formulation. However, due to high alkalinity of some of the applied components, the pH of the prepared control formulation, without adjustment, was found to be approximately pH=8.0. It will be observed that the Test formulation was prepared by post addition of ammonium zirconium carbonate solution (the additive) into the Control formulation. The former is presented in Table 9.1.

TABLE 9.1

| Components of Test Formulation (dispersion & letdown) | Trade names, suppliers of Components | Parts by Weight of Test Formulation |
|---|---|---|
| water | — | 277.0 |
| $TiO_2$ | RCL-535 (1) | 213.0 |
| Filler pigment | 40-27 talc (2) | 111.5 |
| | Albashield 2000 Mica (3) | 25.5 |
| Stain inhibitor pigment | — | 0.0 |
| Coalescent solvent | Texanol (4) | 6.0 |
| Stabilizer(freeze-thaw) | Ethylene glycol | 23.5 |
| Thickener | Natrosol 250 MHR (5) | 4.0 |
| Dispersant | Tamol 731(8) (6) | 7.5 |
| | Igepal CO-630 (7) | 3.5 |
| | Soya lecithin | 4.5 |
| Defoamer | Foamaster G (8) | 4.5 |
| Biocide (in can) | Nuosept 95 (9) | 1.5 |
| PVA Latex resin* | EPS 2537 (10) | 438.0 |
| Stain Inhibitor Additive** | According to Example 3 | 28.0 |
| | total weight | 1148.0 |

*Important to note: the intrinsic pH of the PVA latex was approximately pH = 6.0.
**The Control formulation did not contain any stain inhibitive additive.

Suppliers of components are: (1) SCM Chemicals; (2) Pfizer Co.; (3) Aspect Minerals; (4) Eastman Chemical Co.; (5) Aqualon; (6) Rohm and Haas Co.; (7) GAF; (8) Henkel Co; (9) Nuodex; (10) Engineered Polymer solutions Example 10

To demonstrate the "additive's" tannin stain inhibitive efficiency in PVA latex based paints, the Control and Test formulations presented in Example 9 were applied and tested on redwood panels, following to the procedure described in Example 7, except as follows: the paint formulations were not subjected to heat stability test previous to application, the Control formulation was applied as a topcoat on both the Control and Test primer applications. It will be also observed, due to the well known, comparatively poor tannin stain inhibitive capacity of PVA latex based wood primers, that in this case all discoloration measurements were performed on cured Control and Test coating (primer and top coated primer) applications unexposed to condensing humidity.

The experimental results are presented in Table 10.1.

TABLE 10.1

| | Extent of Discoloration Measured | | Measured Coating Application Inhibitive Efficiency | |
|---|---|---|---|---|
| | dEc | dE | Is % | Ia % |
| Primer | 7.3 | 5.7 | 28 | — |
| Topcoat | 6.8 | 3.8 | — | 75 |

Ia=75% indicates significant inhibitive contribution of the additive of this invention to the tannin stain inhibitive capacity of the PVA based coating system applied on redwood.

These experimental results, thus, demonstrate the applicability and efficiency of ammonium zirconium carbonate as a tannin stain inhibitive additive to PVA based paint formulations intended for wood protection.

I claim:

1. A method of inhibiting tannin staining of clear or light-colored paint coatings on wood comprising
providing an aqueous polymeric latex primer formulation having a pH of 5 to 10 which contains a tannin-stain inhibiting effective amount of a water soluble reactive zirconyl component compatible with said latex primer, said polymer consisting essentially of an acrylic urethane, vinyl polymer, copolymer or blend thereof, said zirconyl component comprising sodium zirconium carbonate, potassium zirconium carbonate or ammonium zirconium carbonate having a molar ratio of $ZrO_2$ to ammonium carbonate of between about 1/1.5 and 1/3 applying said latex primer formulation to a wood surface, and curing said applied formulation thereby forming a semi-permeable film which allows vapor migration but blocks migration of staining molecules, subsequently applying over said cured film a polymeric latex topcoat composition, and subsequently curing said polymeric latex topcoat composition, whereby tannin staining of the resultant topcoat is inhibited.

2. A method according to claim 1 further comprising a metallic cation selected from the group consisting of Co(II), Ni(II), Cu(II), Ag(I) and Zn(II).

3. A method according to claim 2 comprising Zn(II) in an approximate molar ratio of Zr/Zn of about 1/1 to 10/1.

4. A method according to claim 1 wherein said topcoat composition is free of reactive zirconyl components.

* * * * *

(12) EX PARTE REEXAMINATION CERTIFICATE (6260th)

United States Patent
Sinko

(10) Number: US 6,113,989 C1
(45) Certificate Issued: Jun. 17, 2008

(54) AQUEOUS PAINT ADDITIVE FOR STAINING INHIBITION AND PROCEDURES

(75) Inventor: John Sinko, Glendale, WI (US)

(73) Assignee: Wayne Pigment Corp., Milwaukee, WI (US)

Reexamination Request:
No. 90/006,996, Apr. 5, 2004

Reexamination Certificate for:
Patent No.: 6,113,989
Issued: Sep. 5, 2000
Appl. No.: 09/046,354
Filed: Mar. 23, 1998

Related U.S. Application Data

(63) Continuation-in-part of application No. 08/774,810, filed on Dec. 31, 1996, now abandoned.

(51) Int. Cl.
*C09D 5/02* (2006.01)
*B05D 1/36* (2006.01)

(52) U.S. Cl. .............. 427/408; 427/382; 427/419.1; 427/419.8

(58) Field of Classification Search .......... 427/408, 427/382, 419.1, 419.8
See application file for complete search history.

(56) References Cited

U.S. PATENT DOCUMENTS 3,810,852 A * 5/1974 McAlpine et al. ............ 524/43
4,061,720 A * 12/1977 Phillips ..................... 423/265
4,636,548 A * 1/1987 Kossmann et al. ......... 524/524
5,681,880 A * 10/1997 Desor et al. ............... 524/320

OTHER PUBLICATIONS

MEL Chemicals Technical Data Sheet 722.*
Morton International, Inc.'s "Mor–Lok" brochure, dated Nov. 1993.
Halox's "Halox Reports" news publication, dated Fall 1994.
Halox's "XTAIN–A" product literature, dated Aug. 1992.
Halox's "XTAIN–Z" product literature, dated Aug. 1992.
Magnesium Elektron, Inc./MEL Chemicals' "Bacote 20" product literature, Data Sheets 326 and 722.
Magnesium Elektron, Inc./MEL Chemicals' "Zirmel 1000" product literature, Data Sheets 340 and 715.
Magnesium Elektron, Inc./MEL Chemicals' "Protec ZZA" product literature, Data Sheet 734.

* cited by examiner

*Primary Examiner*—Jerry D. Johnson

(57) ABSTRACT

A tannin stain inhibiting latex paint composition for application to wood based on an alkaline latex suspension of a polymer in water is provided with a tannin-stain inhibiting additive. The additive includes effective amount for stain inhibition of a non-acidic compound selected from ammonium zirconium carbonate, sodium zirconium carbonate or potassium zirconium carbonate.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–4 are cancelled.

\* \* \* \* \*